Aug. 19, 1924.

J. H. HERTNER 1,505,889

TRUCK

Filed Sept. 10, 1919    10 Sheets-Sheet 3

Inventor
John H. Hertner
by Edward R. Alexander
Attorney

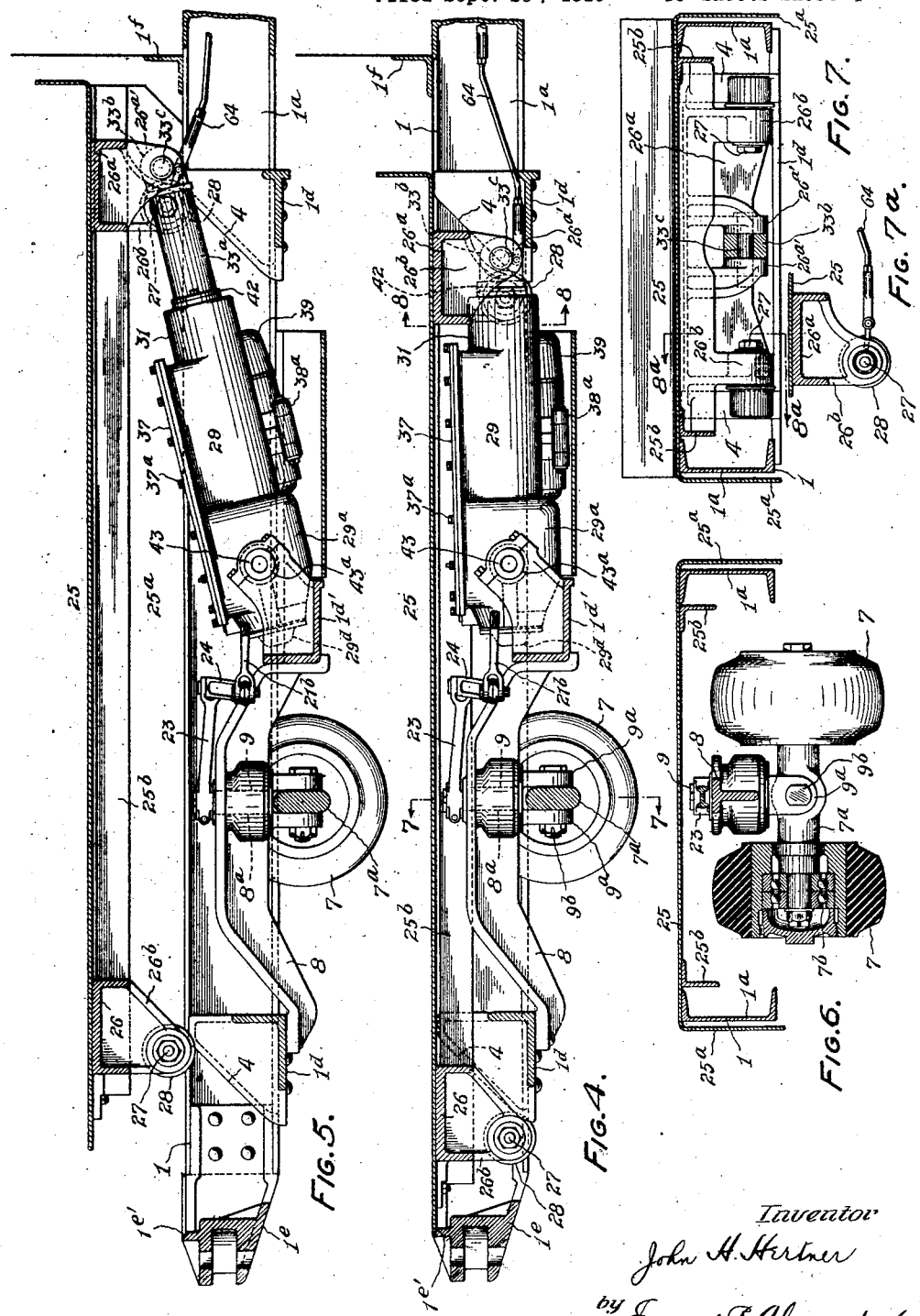

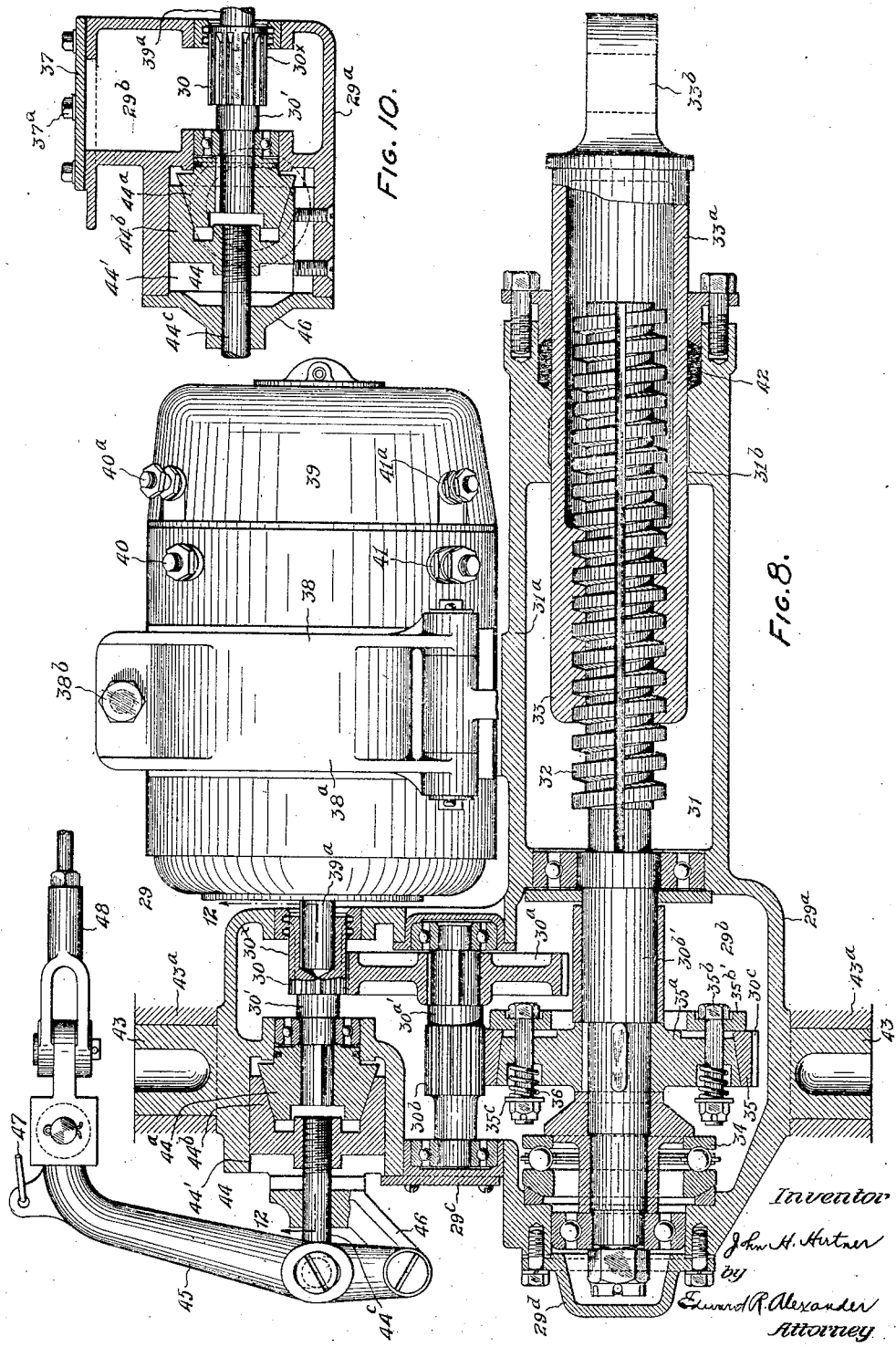

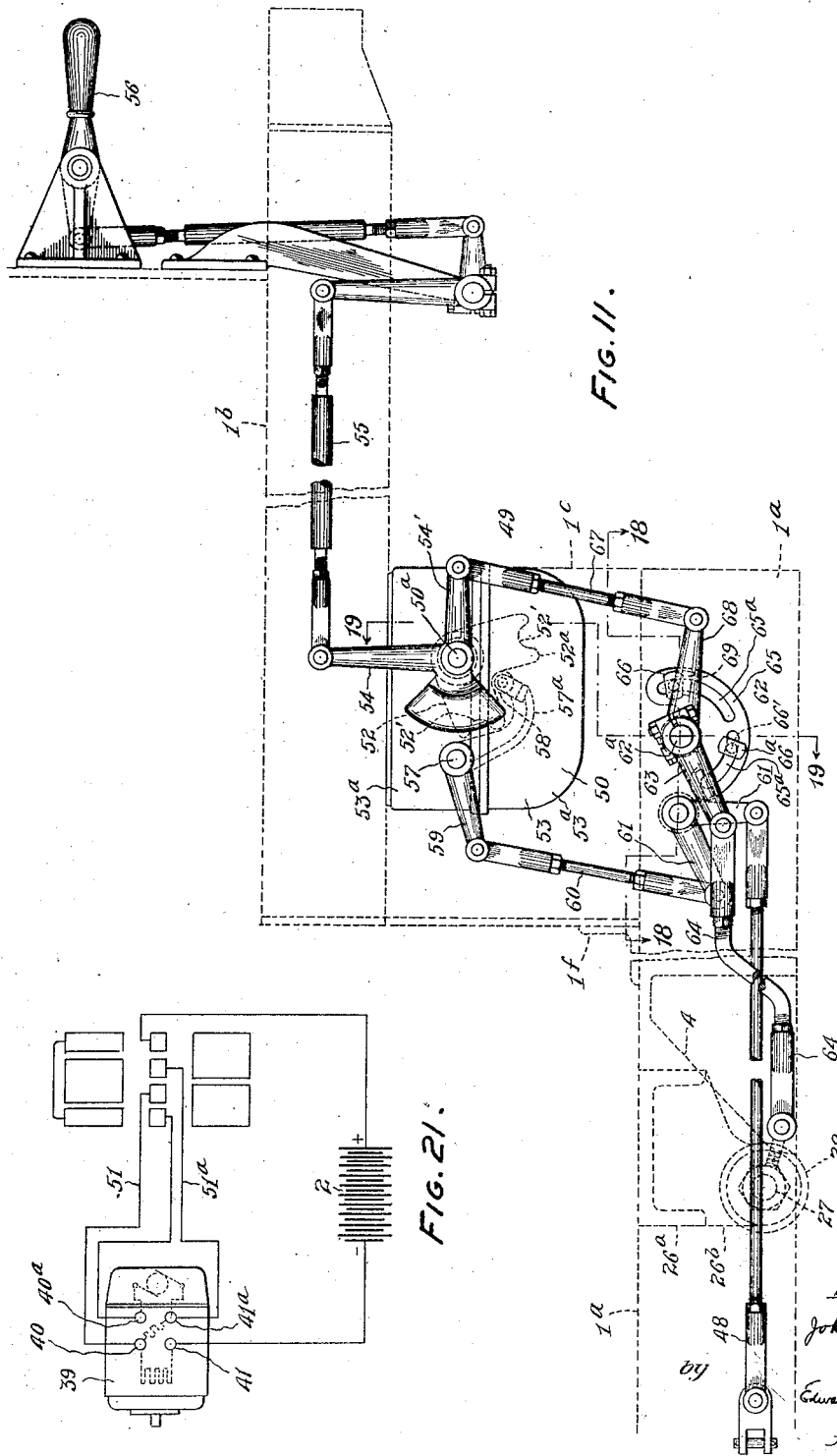

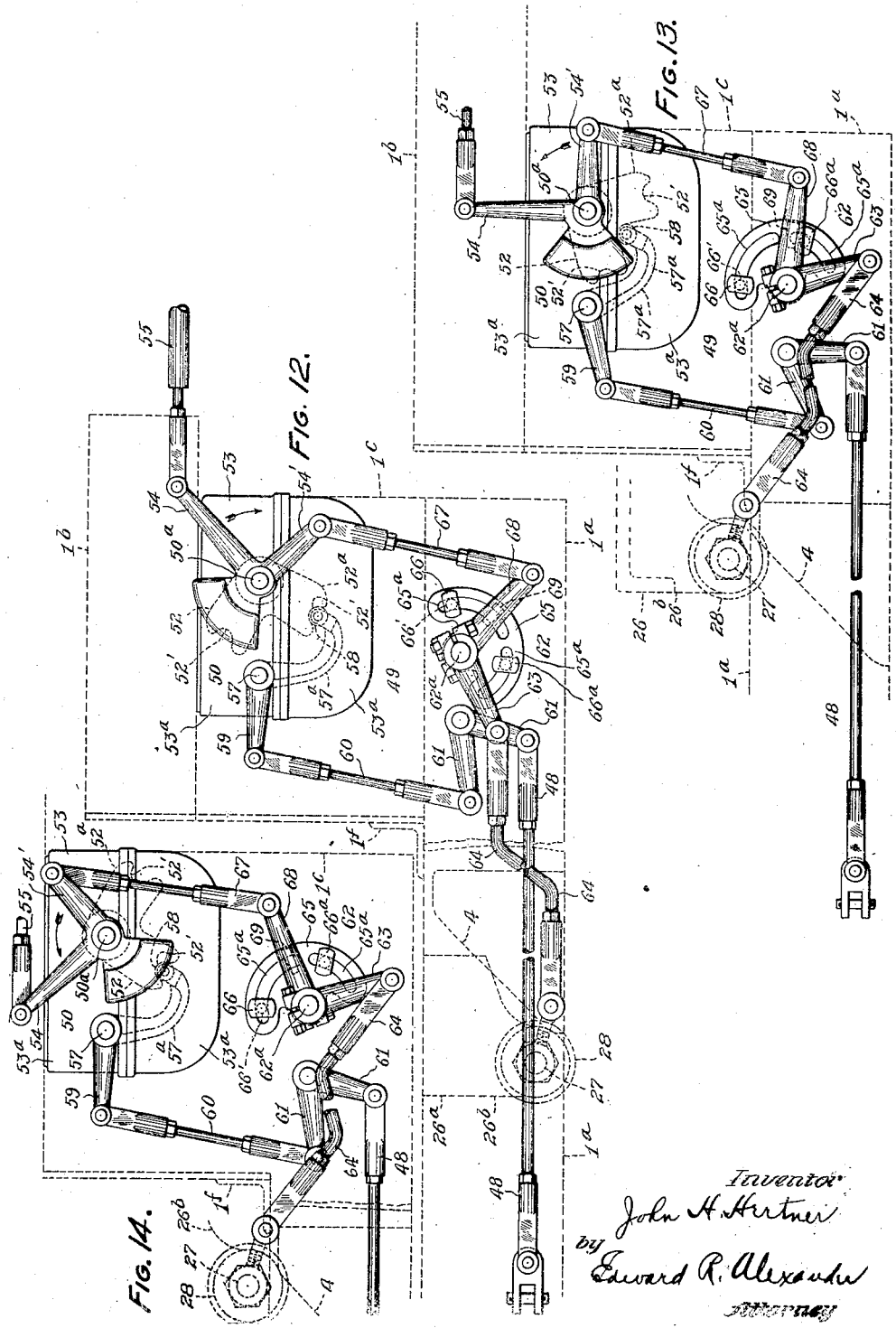

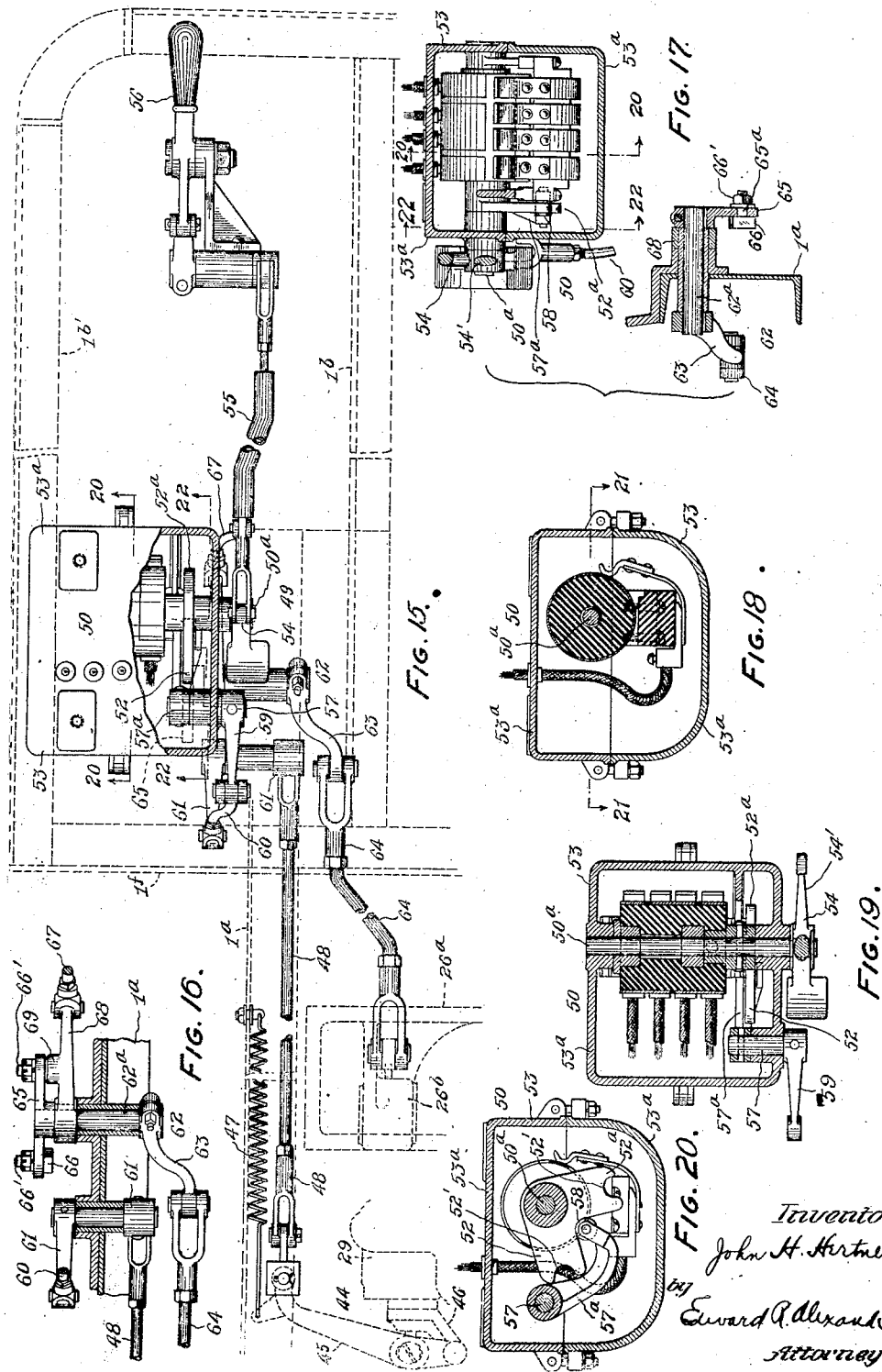

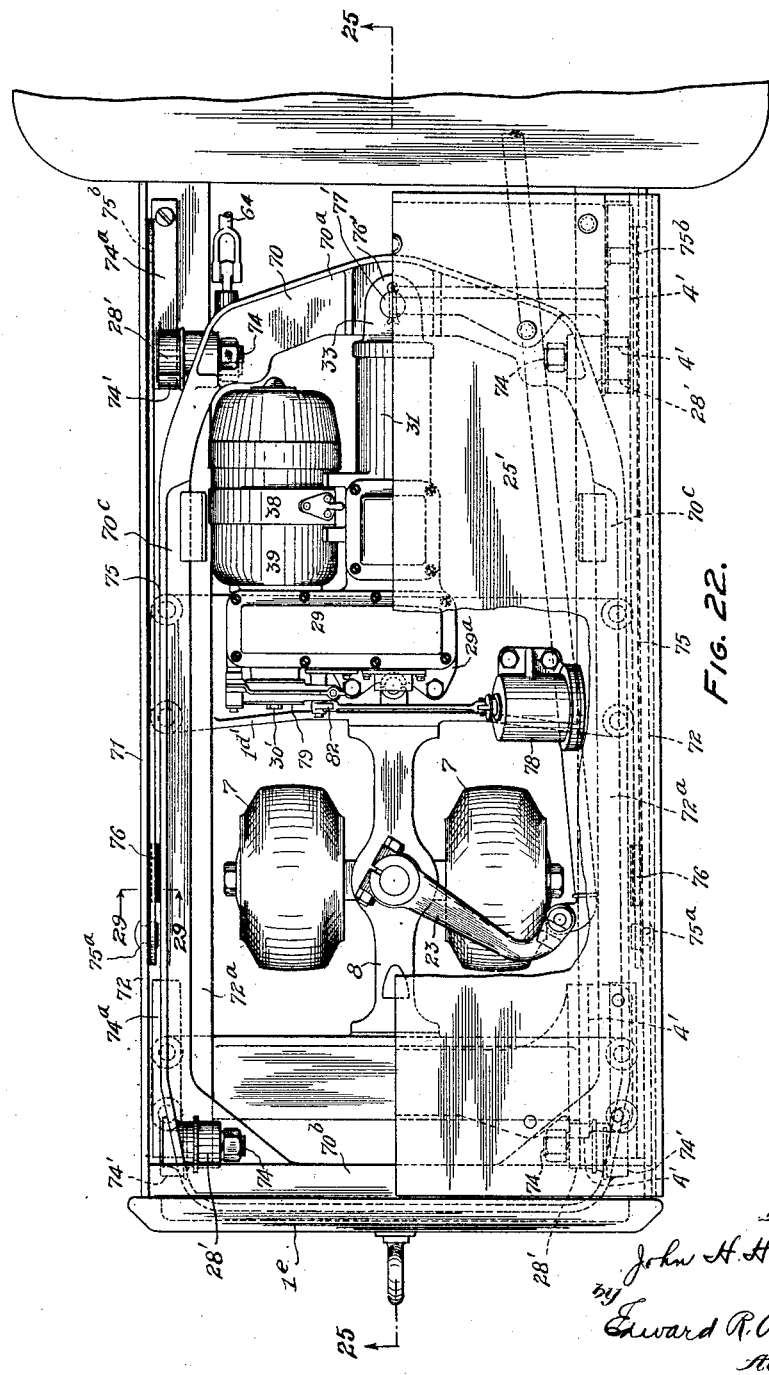

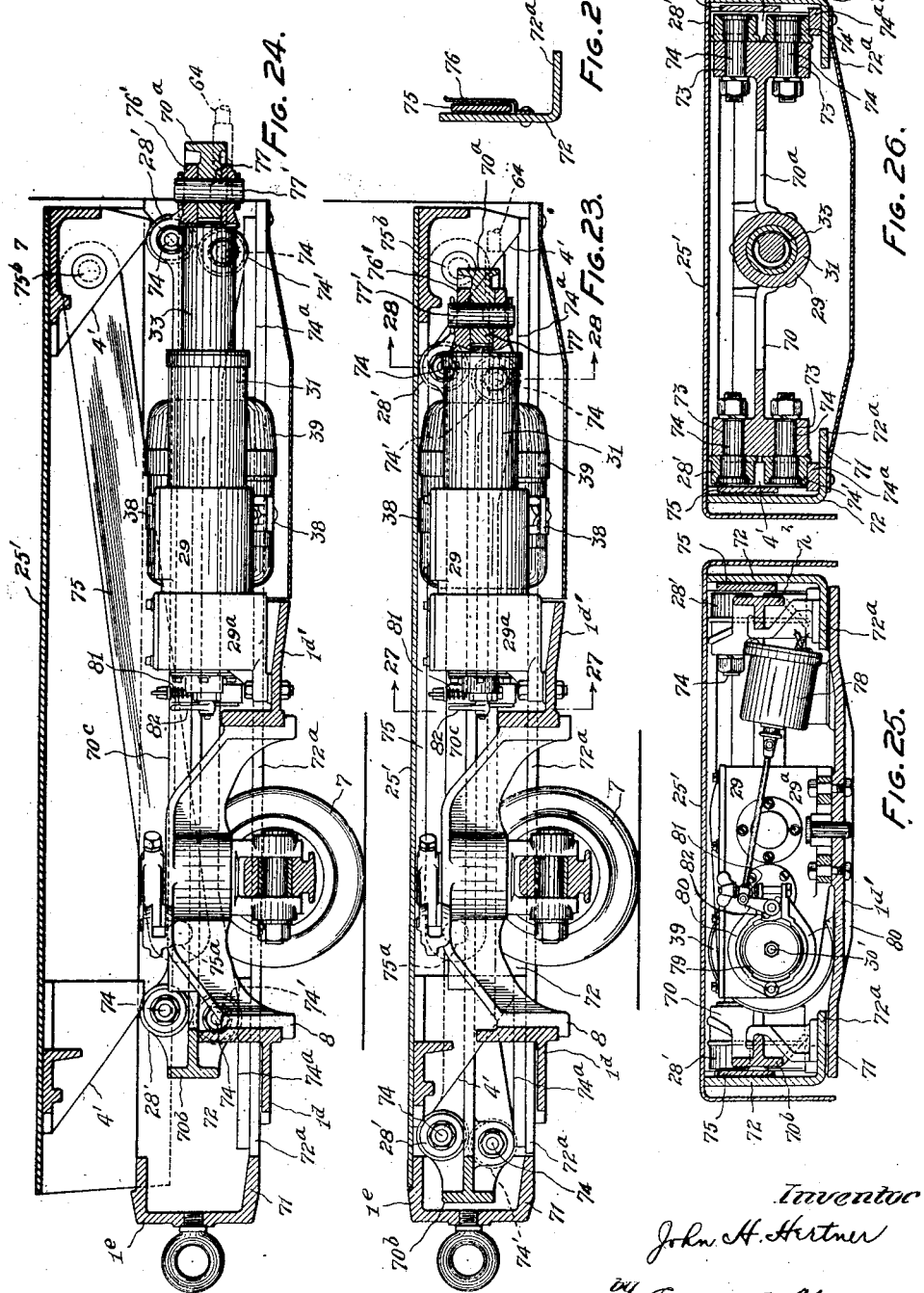

Patented Aug. 19, 1924.

1,505,889

UNITED STATES PATENT OFFICE.

JOHN H. HERTNER, OF LAKEWOOD, OHIO, ASSIGNOR TO THE BAKER R. & L. COMPANY, OF CLEVELAND, OHIO, A CORPORATION OF OHIO.

TRUCK.

Application filed September 10, 1919. Serial No. 322,835.

*To all whom it may concern:*

Be it known that I, JOHN H. HERTNER, a citizen of the United States, residing at Lakewood, in the county of Cuyahoga and State of Ohio, have invented certain new and useful Improvements in and Relating to Trucks, of which the following is a specification.

This invention relates to a motor truck, particularly of the elevating platform type, adapted to transport or move articles and commodities or containers therefor from place to place in a ready manner.

One object of the invention is to mount the platform elevating mechanism and operating motor therefor upon the load bearing portion of the truck frame, whereby the weight of this mechanism and motor may be utilized to steady the frame and overcome any tendency of its load carrying end to rise due to the rapid handling and reversal of movement of the truck.

Another object of the invention is to so position the platform elevating mechanism and operating motor therefor that the same may be readily accessible for assembly, disassembly, inspection, adjustment, lubrication and repairs.

Another object of the invention is to mount the platform operating motor upon the load bearing portion of the truck frame, this arrangement permitting the traction motor to be positioned horizontally, if desired, and freely accessible and the batteries to be positioned in a relatively low, horizontal plane, whereby the center of gravity of the vehicle is lowered and the operator's view of the load carrying end of the truck is at all times unobstructed.

For the purpose of illustration, I have, in the accompanying drawings shown and herein described one form of apparatus embodying my invention.

In the drawings, Fig. 1 illustrates a side elevation of a motor truck, partly broken away, embodying my invention.

Fig. 4 is a fragmentary longitudinal, sectional view on the line 5—5 of Fig. 3, the platform being in its normal or lowered position.

Fig. 5 is a view similar to Fig. 4, but showing the platform elevated.

Fig. 6 is a transverse sectional view on the line 7—7 of Fig. 4.

Fig. 7 is a transverse sectional view on the line 8—8 of Fig. 4.

Figure 1:
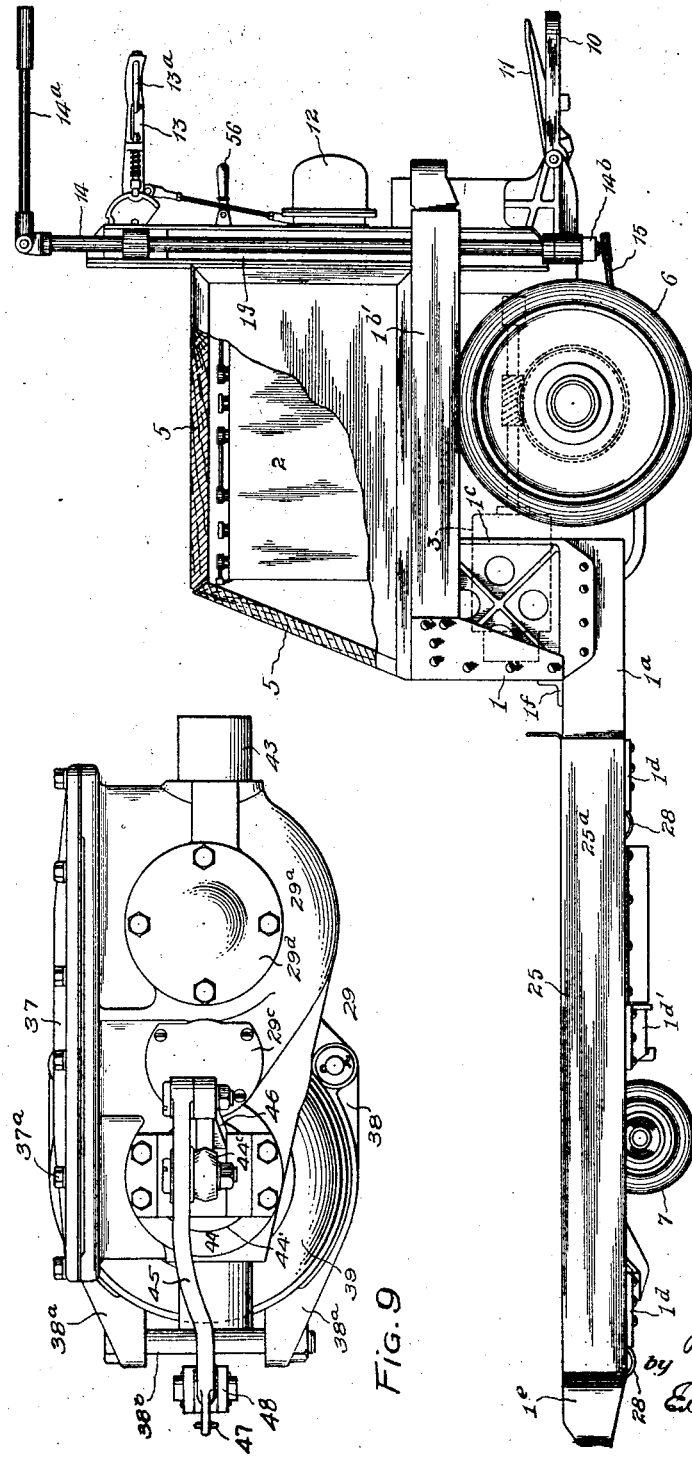

Fig. 7ª is a transverse sectional view on line 8ª—8ª of Fig. 7.

Fig. 8 is a view, partly in section, of the platform operating mechanism, including the motor therefor.

Fig. 9 is an end elevation of the parts shown in Fig. 8 looking towards the right.

Fig. 10 is a sectional view on the line 12—12 of Fig. 9.

Fig. 11 is a view of the lever mechanism and controller for operating the elevating motor.

Figs. 12, 13 and 14 are fragmentary views of the motor operating mechanism showing the operation thereof.

Fig. 15 is a top plan view of the parts shown in Fig. 11, parts being broken away.

Fig. 16 is a sectional view on the line 18—18 of Fig. 11.

Fig. 17 is a section on the line 19—19 of Fig. 11.

Fig. 18 is a section on the line 20—20 of Figs. 15 and 17.

Fig. 19 is a section on the line 21—21 of Fig. 18.

Fig. 20 is a section on the line 22—22 of Fig. 15.

Fig. 21 is a diagrammatic view of the electric circuits.

Fig. 22 is a fragmentary top plan view with parts broken away of the truck embodying a slightly modified form of my invention.

Fig. 23 is a longitudinal sectional view on the line 25—25 of Fig. 22.

Fig. 24 is a view corresponding to Fig. 23, but showing the platform elevated.

Fig. 25 is a transverse sectional view on the line 27—27 of Fig. 23.

Fig. 26 is a transverse section on the line 28—28 of Fig. 23.

Fig. 27 is a fragmentary sectional view on the line 29—29 of Fig. 22.

In the drawings, 1 indicates as an entirety the frame of the truck. The truck frame may comprise a pair of longitudinal, main or side members 1ª, cross members 1ᵈ, 1ᵈ, 1ᵈ′, an end member 1ᵉ, a pair of inner, elevated horizontal sills 1ᵇ, connected at their inner ends to the main members 1ᵃ by brackets 1ᶜ, a pair of outer horizontal sills 1ᵇ′, and a plurality of cross bars 1ᶠ and uprights 1ᵍ. All of these members or elements may be secured together in any well known manner, for example by rivets, to form a rigid frame and the longitudinal members, sills and cross members may be channel or angle shaped to insure strength and rigidity. The horizontal sills 1ᵇ, 1ᵇ′, cross bars 1ᶠ and uprights 1ᵍ may constitute an auxiliary frame or elevated frame section to support the necessary storage batteries 2 and a traction motor 3.

Figure 2:
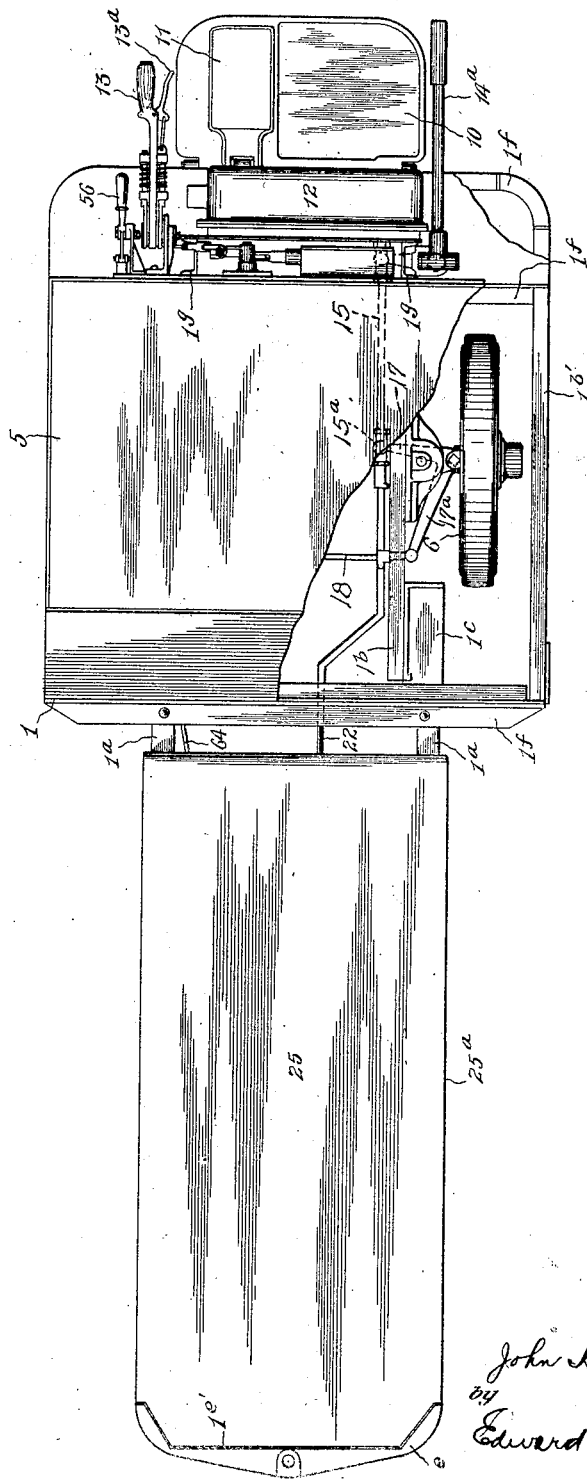
Fig. 2 is a top plan view of the truck, parts being broken away.

Near their opposite ends, the cross members 1ᵈ, 1ᵈ, are provided with inclines 4, the purpose of which will be later set forth. The cross bars 1ᶠ preferably extend beyond the main members 1ᵃ to form an enlarged housing 5 which protects the traction wheels 6 (see Fig. 2) and encloses the motor 3 therefor and storage batteries 2. The traction wheels 6 are mounted on spindles which are connected to the adjacent axle (not shown) by suitable knuckles, whereby they may be used for steering purposes. The knuckles and axle are preferably constructed to receive and support driven axle sections, which are connected by universal joints with the wheel spindles to drive the latter.

7 indicates a pair of relatively small supporting wheels mounted below the main portion of the truck frame 1. The wheels 7 may be of any desired form of construction. 7ᵃ indicates the axle for the wheels 7. 7ᵇ indicates one or more anti-friction bearings between the axle 7ᵃ and each wheel 7. 8 indicates a truss member arranged midway between and parallel to the frame members 1ᵃ. The front and rear ends of the truss member 8 are connected in any well known manner to and supported by the cross members 1ᵈ and 1ᵈ′. 8ᵃ indicates an opening formed in the truss member 8 to receive and support a king bolt 9 connected at its lower free end to the axle 7ᵃ. The lower free end of the king bolt 9 is preferably bifurcated, as shown at 9ᵃ, and straddles the axle 7ᵃ. 9ᵇ indicates a pin or bolt which extends through openings formed in the bifurcations 9ᵃ and axle 7ᵃ and pivotally connects the king bolt 9 and axle 7ᵃ together, this form of construction permitting the wheels 7 to rock about the lower end of the king bolt 9 and accommodate themselves to the unevenness of the floor at all times.

10 indicates a platform on which the operative stands. The platform may be pivoted to suitable brackets depending from the outer cross bar 1ᶠ, whereby it may be raised and thrown back against the truck when the latter is not in use. 11 indicates a brake pedal so arranged on or relative to the platform that the operative can readily operate it with his foot while standing thereon. The pedal 11 is preferably pivoted on the same rod or shaft as the platform 10 so that both may be thrown into an inoperative position together. The pedal 11 is connected to and operates upon the brake (not shown) which acts upon the traction motor 3 or an element driven thereby. The brake is spring operated and the connections are so arranged that downward pressure on the pedal 11 will release the brake, which condition will continue until the pressure on the pedal is released.

12 indicates a controller through which the electric circuit from the batteries 2 is completed to operate the motor 3 in either direction. 13 is a suitable handle having a trigger mechanism 13ᵃ, for operating the controller 12.

The traction and supporting wheels 6 and 7 are preferably connected together by suitable steering connections (certain elements of which are shown in dotted lines in Fig. 3), whereby they may be steered simultaneously to facilitate operation and handling of the truck from place to place and into and out of loading and unloading position. Of the steering connections, 14 indicates a rod rotatably mounted on one of the uprights 1ᵍ. At its upper end the rod 14 carries a handle 14ᵃ; at its lower end it carries an arm 14ᵇ which is pivotally connected to a link 15. The link 15 is pivotally connected at 15ᵃ to an arm 17 connected to the adjacent traction wheel knuckle which in turn carries a lever 17ᵃ that is connected through a tie 18 to a lever on the other traction wheel knuckle. 20 indicates a bracket fixed in any well known manner to the adjacent frame member 1ᵃ. 21 indicates a bell crank lever pivoted to the bracket 20. 22 indicates a rod pivotally connected at its opposite ends to the arm 21ᵃ of the lever 21 and arm 17. 23 indicates an arm rigidly connected to the king bolt 9. 24 indicates a link pivotally connected at its opposite ends to the free end of the arm 23 and arm 21ᵇ of the lever 21. By reference to Fig. 2 it will be readily seen that by operation of the handle 14ᵃ in one direction or the other, the traction wheels 6 will be turned on their knuckles and the wheels 7 will be turned or swung about the king bolt 9, but in an opposite direction to the traction wheels 6. As a result of these steering connections, the truck can be readily steered and caused to turn about relatively small arcs or curves.

25 indicates as an entirety the raising and lowering platform for the truck. It is preferably formed of sheet metal and provided with depending side walls 25ᵃ. The frame end member 1ᵉ is preferably cut away at 1ᵉ′, to receive the free end of the platform 25, whereby the latter will lie flush with the upper surface of the end member. The platform 25 is strengthened longitudinally by a pair of angle members $25^b$, which are preferably spaced to engage the frame members $1^a$ when the platform is lowered (see Fig. 6) and thereby assist in maintaining the platform in proper position. 26, $26^a$, indicates a pair of channel bars arranged near the opposite ends of the platform 25 and extending transversely thereof. At its opposite ends each bar 26, $26^a$, is provided with depending arms $26^b$. 27 indicates a stud shaft carried by each depending arm and arranged to loosely support a roller 28, which engages with the adjacent incline 4. The rollers 28 are preferably flanged so as to guide the platform and prevent lateral movement thereof at all times. The lowermost or normal position of the platform 25 is shown in Figs. 1, 2, 3 and 4, but movement of the platform longitudinally inwardly or in a direction toward the operative's platform 10, will, through the co-action of the rollers 28 and inclines 4, elevate it to the position shown in Fig. 5; likewise, operation of the platform in the opposite direction will cause it to be lowered to normal position. 29 indicates as an entirety the mechanism for moving the platform interposed between and preferably pivotally connected to the main frame of the truck and the platform 25, whereby it may accommodate itself to the position or positions of the latter as the platform rises and falls. Of this mechanism, $29^a$ indicates a hollow casing having a chamber $29^b$ adapted to contain speed reducing gears 30, $30^a$, $30^b$, and $30^c$, and a chamber 31 adapted to contain a screw or worm 32 and a nut 33. The gears 30, $30^a$, and $30^c$ are mounted on or fixed to shafts $30'$, $30^{a'}$ and $30^{b'}$, respectively, which are suitably mounted in bearings, (preferably ball bearings) of any desired type. The casing is formed with suitable openings to permit adjustment of the bearings, as well as assembly and disassembly of the shafts and gears, said openings being closed by removable plates $29^c$, $29^d$. As shown in Fig. 8, the shaft $30^{b'}$ is an extension of the screw or worm 32. 34 indicates a thrust bearing of any desired type arranged at or near the outer end of the shaft $30^{b'}$. This bearing is interposed between the shaft $30^{b'}$ and walls of the casing $29^a$, and takes all thrust endwise of the shaft during the raising of the platform, as well as during the lowering of the platform due to the gravitation of the load thereon. The gear $30^c$ is preferably formed of two relatively movable elements 35, $35^a$, having conical engaging surfaces which are resiliently clamped together by bolts $35^b$, a ring $35^{b'}$ and coiled springs 36 between suitable washers $35^c$ on the clamping bolts and the adjacent gear element. The purpose of this construction is to adjust the clamping action between the gear elements 35, $35^a$, to transmit the power to the shaft $30^{b'}$ up to any predetermined load on the platform and thereby regulate the load which may be placed on the motor. 37 indicates a cover for the chambers $29^b$ and 31. The cover 37 is shaped to engage the side walls of the casing 29. The cover 37 is preferably secured to the walls of the casing 29 by cap screws $37^a$. 38 indicates a cradle arranged to receive and support an electric motor 39. The cradle 38 preferably comprises a pair of arms $38^a$, $38^a$, preferably pivoted at their inner ends to the wall $31^a$ of the chamber 31. The outer ends of the arms $38^a$ are formed with openings arranged to receive a clamping bolt and nut (indicated at $38^b$) the tightening of which serves to rigidly support the motor 39 on the casing $29^a$. The motor 39 may be connected to the gear train in any desired manner. This connection is preferably effected by so mounting the motor that its armature shaft $39^a$ will be in axial alignment with the shaft $30'$ and providing the latter with a socket $30^x$ into which the armature shaft $39^a$ extends, thus permitting the two shafts to be keyed together in a well known manner. The motor 39 is arranged to be driven in both directions (it being provided with two sets of terminals 40, $40^a$ and 41, $41^a$, for this purpose) to rotate the screw or worm 32 in either direction to raise and lower the platform 25.

Figure 3:
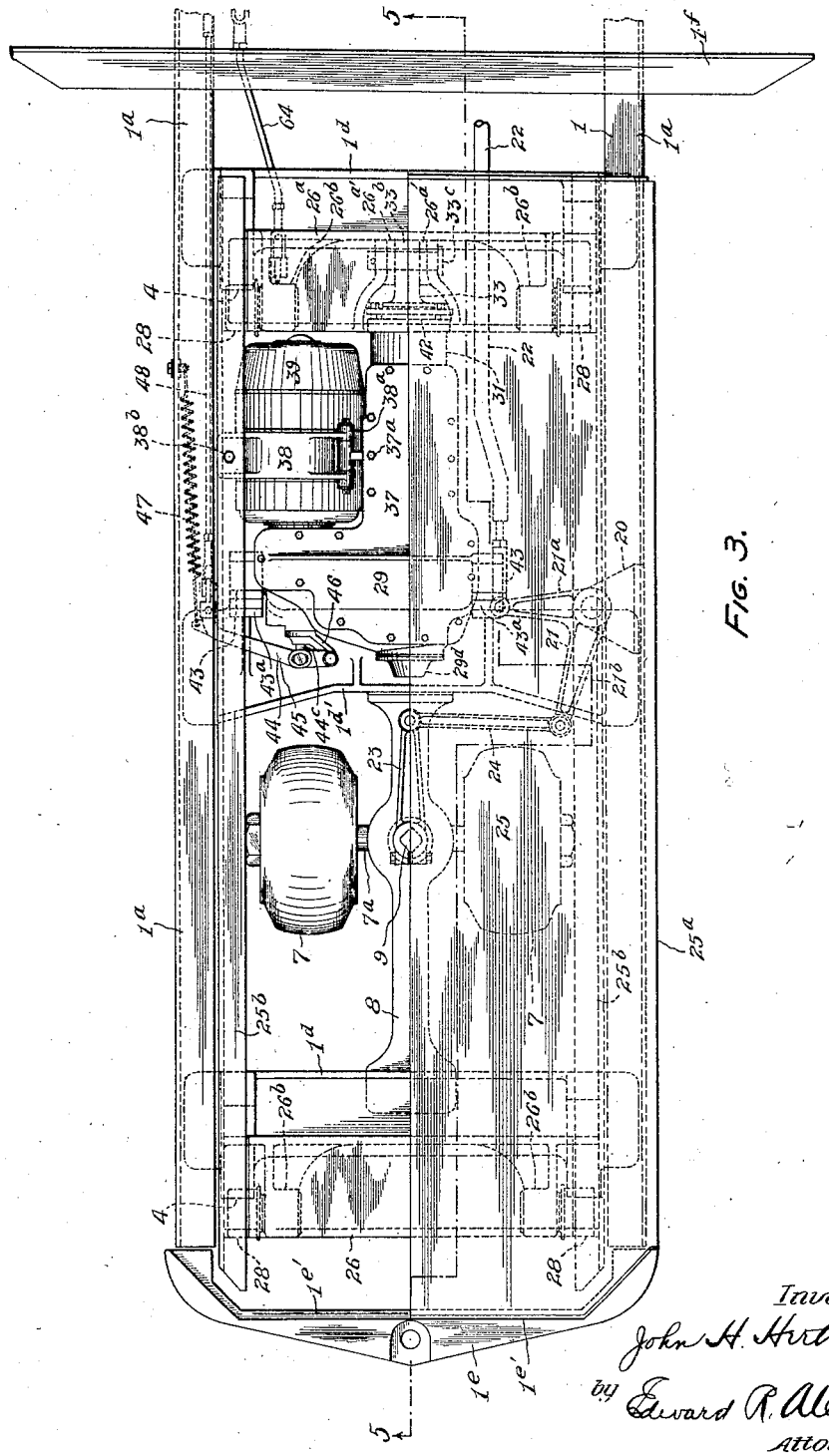
Fig. 3 is a fragmentary top plan view, with a portion of the platform broken away.

The nut 33 preferably comprises a hollow thrust member $33^a$ which slidably fits in an opening $31^b$ leading into the chamber 31. As this chamber is preferably filled with a suitable lubricant for lubricating the screw 32 and nut 33, I provide a gland 42 around the hollow nut member at the outer end of the chamber 31. At its outer end, the hollow member $33^a$ is provided with a knuckle $33^b$ which fits between a pair of knuckles $26^{a'}$ depending from the channel bar $26^a$. $33^c$ indicates a pintle extending through the knuckles $33^b$, $26^{a'}$, $26^{a'}$, and serving to pivotally connect them together, thereby forming a pivot connection between the nut 33 and platform 25. As shown in Fig. 3, the elements of the elevating mechanism are preferably arranged to position the axes of the screw 32 and nut 33 in the central longitudinal plane of the platform 25, so that the power of the screw will be exerted in a direction parallel to and midway between the inclines 4 and hence prevent any disalignment of the platform relative to the truck frame while being operated.

43 indicates trunnions for the casing $29^a$. These trunnions are preferably formed integral with and extend from the opposite side walls of the casing $29^a$ forming the chamber $29^b$. The trunnions 43 are mounted in bearings provided on brackets 43ª preferably formed integrally on the cross member 1ᵈ'. By means of the trunnions 43 and the bearings therefor, the platform elevating mechanism 29, including the operating motor therefor, is mounted on and supported entirely by the main frame of the truck. As will be readily understood from the foregoing description, the trunnions 43 permit the elevating mechanism 29 and its motor 39 to swing upwardly and downwardly as it raises and lowers the platform 25.

44 indicates a brake mechanism for one of the driven elements of the platform operating mechanism 29. The brake mechanism is preferably applied to the shaft 30' and may comprise a pair of cone shaped male and female elements 44ª, 44ᵇ, respectively, the former of which is fixed in a well known manner to the shaft 30'. 45 indicates a lever mounted on a bracket 46 fixed to the casing 29ª. 44ᶜ indicates a rod pivoted at one end to the lever 45 and connected, preferably adjustably, with the brake element 44ᵇ, whereby movement of the lever 45 inwardly will press the brake element 44ᵇ, against the other brake element 44ª and stop the shaft 30'.

The connection between the outer end of the rod 44ᶜ and lever 45 is preferably of the slidable pivotal type whereby it will accommodate itself to the movement of the lever 45 as the lever swings about its pivot.

47 indicates a spring, one end of which is fixed to the adjacent frame member 1ª. The opposite end of the spring 47 is connected to the lever 45 and acts at all times to move the lever in the direction to press the brake elements together. 48 is a rod pivotally connected to the lever 45 and arranged to move it in a direction to release the brake elements 44ª, 44ᵇ, by a control mechanism 49 presently to be described. As shown in Figs. 8 and 10, the walls of the casing 29ª are shaped to form a suitable chamber 44' for the brake mechanism 44.

Of the motor operating mechanism 49, 50 indicates a controller the shaft 50ª of which is movable in opposite directions to complete the circuits 51, 51ª, to cause rotation of the motor armature shaft 59ª in one direction or the other. The controller shaft 50ª carries a pair of cams 52, 52ª, the purpose of which will be later set forth. The controller 50 is preferably enclosed within a casing 53 which may be formed of two box sections 53ª, secured together in any desired manner. 54 indicates an arm fixed to the shaft 50ª. The arm 54 may comprise one arm of a bell crank lever. The other arm 54' of the lever will be later referred to. 55 indicates connections leading from the arm 54 to a handle 56 by means of which the connections 55 and through them the controller shaft 50ª are operated. The handle 56 and the elements constituting the connections 55 are preferably mounted upon the frame work of the vehicle, as clearly shown in Fig. 11.

57 indicates a rock shaft mounted in suitable bearings carried by a side wall of one of the box sections 53ª (see Fig. 19). At its inner end the shaft has fixed to it a lever 57ª adapted to engage with the cams 52, 52ª. When the shaft 50ª is in neutral position, the engaging end of the arm or lever 57ª is disposed between the cams 52, 52ª, (see Fig. 20) in position to engage either one of them accordingly as the shaft 50ª is moved in one direction or the other (see Figs. 12, 13 and 14). The cams 52, 52ª, are so arranged that upon the operation of the shaft 50ª in either direction one of them will swing the lever 57ª and thus cause the shaft 57 to rock. The outer end of the lever 57ª is preferably provided with an anti-friction roller 58 which rolls on the cam surfaces. At its outer end each cam is provided with a notch 52' to receive the roller 58. The engagement of the roller 58 with the notch 52' not only holds the lever 57ª in operated position, but also prevents movement of the controller under the influence of the spring 47 back to its normal position. At its outer end the shaft 57 carries a lever 59 to which is connected a rod 60. 61 indicates a bell crank lever pivotally mounted on the adjacent frame member. One arm of the lever 61 is pivotally connected to the opposite end of the rod 60; the other arm of the lever 61 is pivotally connected to the forward end of the rod 48. From the foregoing description it will be seen that when the controller 50 is operated by movement of the handle 56, to drive the elevating motor 39, one of the cams 52, 52ª through the lever 57ª and connections 59, 60 and 61, pushes the rod 48 rearwardly, the effect of which is to release the brake 44. By operating the handle 56 in the opposite direction with sufficient force to overcome the resistance due to the engagement of the roller 58 with the walls of the adjacent notch 52', the current may be cut off and the motor stopped. Simultaneously the arm 57ª will assume its normal position (see Figs. 11, 13 and 20), allowing the brake 44 to operate under the influence of the spring 47. The elements just referred to are preferably so arranged and correlated that the spring 47 will not only reset the brake 44, but will also transmit its power through the rod 48, lever 61, rod 60, arm 59 and shaft 57 to the arm 57ª, whereby the latter acting upon one of the cams 52, 52ª, will move the controller shaft 50ª, back to its neutral position whenever sufficient movement of the shaft 50ª takes place to move the roller out of the adjacent notch 52' and over the wall thereof.

I prefer to provide between the controller shaft 50ª and the platform 25 means (indicated as an entirety at 62) which automatically release the controller 50, upon the platform reaching either its extreme upper or lower position.

Of these release means 62, 62ª indicates a rock shaft mounted in suitable bearings carried by one of the frame members (see Fig. 16). At its inner end the shaft 62ª carries an arm 63 to the free end of which is pivotally connected a rod 64. The rear end of the rod 64 is pivotally connected in any well known manner to the forward end of the platform 25, preferably the channel bar 26ª thereof. By this construction and arrangement it will be seen that the platform 25, will, through the rod 64, and arm 63 rock the shaft 62ª, as it moves upwardly and downwardly. At its outer end the rock shaft 62ª carries a plate 65 on which are mounted a pair of spaced tappets 66, 66ª. The plate 65 is fixed to the shaft 62ª in any desired way. 67 indicates a rod pivotally connected to the arm 54' at one end and at its opposite end to a lever 68 loosely mounted on the shaft 62ª (see Figs. 16 and 17). 69 indicates a lug carried by the lever 68 and arranged in the path of movement of the tappets 66, 66ª. Accordingly, as the plate 65 moves about the axis of the shaft 62ª, one of the tappets, 66, 66ª, will engage with the lug 69 and move the arm 68, which in turn through the rod 67 and arm 54' will move the controller shaft 50ª toward its neutral position. The tappet is so arranged that it will move the arm 68 and the elements connected thereto far enough to release the roller 58 from the adjacent notch 52', whereupon the arm 57ª, through its engagement with the adjacent cam, and acting under the influence of the spring 47, will complete the movement of the shaft 50ª to neutral position. The plate 65 is preferably provided with two arc-shaped slots 65ª which permit adjustment of each of the tappets 66, 66ª, angularly about the axis of the shaft 62ª. By means of such adjustment, release of the controller shaft 50ª and the subsequent cutting off of the current can be effected at any desired point in the movement upwardly or downwardly of the platform 25. To permit of ready adjustment, each of the tappets 66, 66ª, may consist of a bolt 66' extending through the adjacent slot 65ª and carrying on its outer end a nut to clamp the bolt head against the plate 65. When this construction is employed, the head of the bolt 66' may serve as the tappet to engage the lug 69.

A brief description of the operation of the release mechanism 62 will make its construction clear. Assuming that the elements are at rest and the platform 25 is in its lowermost position, operation of the handle 56 will move the arms 54, 54' and shaft 50ª in a clockwise direction (see arrow in Fig. 12) and position the lug 69 substantially midway between the tappets 66, 66ª. The circuit to the motor 39 having been closed the motor will be operated and the platform 25 raised to the position shown in Fig. 13. The movement of the platform 25, through the rod 64, arm 63, and shaft 62ª, will swing the plate 65 about the axis of the shaft 62ª. As the platform approaches the limit of its movement, the tappet 66ª will engage the lug 69 and through it move the arm 68 sufficiently to disengage the roller from the notch 52' and hence release the controller shaft 50ª in the manner already described and permit the latter to be returned to neutral position under the action of the spring 47. If now it is desired to lower the platform 25, the handle 56 is operated in the opposite direction to move the controller shaft 50ª to the position shown in Fig. 14. This operation will position the lug 69 substantially midway between the tappets 66, 66ª, so that as the platform 25 moves downwardly, the plate 65 will be moved in the opposite direction and cause engagement of the tappet 66 with the lug 69.

It will thus be seen that when the elevating motor 39 is set in operation for raising and lowering the platform, the release means 62 will automatically stop or shut off the current to the motor at the proper time as the platform moves to its extreme position in either direction. This construction not only prevents any damage occurring to the apparatus but it saves time, relieves the operative of care and responsibility and lessens the wear on the elevating motor and other elements of the apparatus.

In the modified form of construction shown in Figs. 22 to 27, inclusive, I have reversed certain elements of the elevating mechanism, namely, the inclines 4' and cooperating rollers, mounting the inclines 4' on the underside of the elevating platform 25'. When the truck is constructed in this manner I prefer to provide a longitudinally movable intermediate frame 70 (to be later referred to) carrying a set of rollers 28' which, through their engagement with the inclines 4', will cause the platform 25' to be raised and lowered.

Referring to these figures, 71 indicates the frame of the truck which is preferably similar in construction to that shown in Fig. 1, except that the main longitudinal members are formed from L-bars 72, the inturned ends 72ª of which serve as supports for the intermediate frame 70. The frame 70 may comprise a casting having end members 70ª, 70ᵇ, and side members 70ᶜ. At its opposite ends the walls of the frame 70 are thickened (see Fig. 26) and formed with openings 73 in which are mounted stub shafts 74.

The upper shafts 74 carry the rollers 28'; while the lower shafts carry rollers 74' which engage suitable guides 74ᵃ on the inturned ends 72ᵃ of the frame members 72, and permits the frame 70 to move endwise horizontally in opposite directions to effect the raising and lowering of the platform 25', as will later be set forth. The intermediate frame 70 is normally arranged adjacent to that end of the frame remote from the batteries (see Fig. 23) and when moved forward, it operates through the engagement of the rollers 28' with the inclines 4' to elevate the platforms 25' to the position shown in Fig. 24. The platform 25' is held against longitudinal movement by a pair of links 75 pivoted at their opposite ends in any well known manner to the frame members 72 and the platform 25, as shown at 75ᵃ, 75ᵇ. 76 indicates a guide plate fixed to each frame member 72 and serving to guide the adjacent link 75 as it moves up and down. As will be understood, the links 75 permit the platform 25' to rise substantially vertical, but hold it against longitudinal movement in order that the rollers 28' may co-act with the inclines 4' to elevate the platform.

In this form of construction the power mechanism 29, the casing 29ᵃ therefor, the cradle 38 and motor 39 are all stationarily mounted on the frame 72 and cross member 1ᵈ'. As shown in Figs. 23 and 24, the outer end of the nut or thrust member 33 is bifurcated at 76' to receive between them the web portion 77 of or a lug carried by the intermediate frame 70. The bifurcations 76' and web 77 are formed with openings, adapted to register with each other to receive a pin 77', whereby the nut 33 and frame 70 are connected together.

When the motor 39 is mounted as just set forth, I prefer to provide an electric brake, the solenoid 78 for which may be mounted in any desired manner on the cross member 1ᵈ' (see Figs. 22 and 25). The shaft 30' is extended beyond the casing 29 and provided with a band wheel 79 with which the braking elements, indicated at 80, engage. These braking elements may be of any desired construction. They are preferably controlled by a spring 81, which tends to maintain them in engagement with the band wheel at all times, and a rocker 82, which is connected to and operated by the solenoid 78. The electric connections for the solenoid are such that when the motor 39 is stopped all current is cut out of the solenoid; but when the motor is started current will flow to and through the solenoid and energize it and hence cause the brake to be released.

In my construction of motor truck I secure many important advantages, namely, among others, compactness, simplicity and cheapness of construction. Furthermore, I am enabled to properly distribute the weight of the vehicle upon all its wheels, this arrangement also being advantageous in that it tends to permit easier steering. By mounting the elevating motor 39 and the driving connections below the elevating platform or at a point adjacent to the supporting wheels 7, I am enabled to utilize their weight and the weight of other elements associated with the motor to maintain the wheels 7 in engagement with the floor at all times and completely overcome the tendencies in apparatus of the character, to tilt upwardly when in operation due to starting and stopping of the apparatus. This arrangement also permits the housing and frame-work over the traction wheels 6 to be made lower so that the operator standing on the platform has an unobstructed view at all times. Notwithstanding the fact that the elevating motor is arranged below the rising and falling platform, I am enabled to provide a relatively low vehicle frame on which the platform rests when in its lowermost position and to insure ample movement upwardly and downwardly for the platform to meet the usual conditions for which this type of vehicle is intended.

To those skilled in the art to which this invention relates many alterations in construction and widely differing embodiments and applications of my invention will suggest themselves without departing from the spirit and scope thereof. My disclosures and description herein are purely illustrative and are not intended to be in any sense limiting.

What I claim is:

1. In an elevating platform truck, the combination of a frame comprising a relatively low platform carrying section and an elevated section, traction wheels for said elevated section, means supported by said elevated section for driving said traction wheels, supporting wheels for said platform carrying section, a platform carried by said latter section and bodily movable relatively thereto, a motor carried by said platform carrying section and disposed between the side member thereof, and connections between said motor and said platform for raising and lowering the latter.

2. In an elevating platform truck, the combinaton of a frame comprising a relatively low frame section and an elevated section, traction wheels for said elevated section, means supported by said elevated section for driving said traction wheels, supporting wheels for said low frame section, a platform carried by said latter section arranged to be projected underneath a load and bodily moved upwardly relative to said low frame section, a motor carried by said low frame section and disposed between the side members thereof, and connections between said motor and said platform for raising and lowering the latter.

3. In an elevating platform truck, the combination of a frame comprising a relatively low frame section and an elevated section, traction wheels for said elevated section, means supported by said elevated section for driving said traction wheels, supporting wheels for said low frame section, a platform carried by the latter section and bodily movable relative thereto, a motor carried by said low frame section between the sides thereof and below the plane of said platform when the latter is in its lowered position, and connections between said motor and said platform for raising and lowering the latter.

4. In apparatus of the class described, the combination of a frame, supporting wheels therefor, a platform mounted on and movably connected to said frame, whereby it may be raised and lowered relative thereto, mechanism including a motor, arranged underneath said platform and pivotally connected thereto and to said frame for raising said platform.

5. In apparatus of the class described, the combination of a pair of frame members, supporting wheels therefor, a platform movably mounted on said frame members, whereby it may be raised and lowered relative thereto, relatively movable elements arranged underneath said platform, one pivotally connected to said platform and the other trunnioned on said frame members, and driving connections and a motor carried by one of said elements for raising said platform.

6. In apparatus of the class described, the combination of a pair of frame members, supporting wheels therefor, a platform movably mounted on said frame members, whereby it may be raised and lowered relative thereto, a casing trunnioned between said frame members underneath said platform, driving connections within and a motor carried by said casing, said connections including a driven element, and an element co-acting with said driven element and pivotally connected to said platform to raise the latter.

7. In apparatus of the class described, the combination of a pair of frame members, supporting wheels therefor, a platform movably mounted on said frame members, whereby it may be raised and lowered relative thereto, a casing trunnioned on said frame members underneath said platform and provided with an extension, driving connections within said casing, said connections including a screw extending into and longitudinally of said extension, a member telescopically fitting said extension and pivotally connected to said platform, and a worm nut within and carried by said member and arranged to engage said screw.

8. In apparatus of the class described, the combination of a frame having a pair of relatively low horizontal, longitudinally extending members at one end of the frame, supporting wheels for said frame, two of said wheels being relatively small in diameter and arranged near the outer end of said horizontal members, a platform movably mounted on said horizontal members, whereby it may be raised and lowered, and mechanism, including a motor, between said horizontal members and said platform for raising the latter, said motor being arranged below said platform and adjacent said relatively small supporting wheels.

9. In a truck construction, the combination of a frame having a pair of relatively low horizontal longitudinally extending members, a pair of transverse members between said horizontal members, a longitudinal support connected to said transverse members and arranged centrally of said longitudinally extending members, a pair of wheels having their axles pivoted to said support, a platform movably mounted on said longitudinally extending members, whereby it may be raised and lowered, and operating mechanism, including a motor, arranged underneath said platform for raising it, said transverse members, support, wheels, and axles for said wheels and said operating mechanism and motor when the platform is in lowered position, being disposed below the plane of the upper surfaces of said longitudinally extending members.

10. In apparatus of the class described, the combination of a frame having a pair of relatively low horizontal members, supporting wheels for said frame, power means for driving certain of said wheels, a platform mounted on said horizontal members, sets of co-acting devices between said members and said platform, one set comprising a plurality of inclines and the other set comprising a plurality of rollers engaging the said inclines, a motor mounted between said horizontal members below the upper surfaces thereof, and an element operated by said motor in a direction parallel to the vertical planes in which said rollers move to engage said inclines and having operative connection with said platform to move it, whereby the said sets of devices co-act to raise and lower said platform relative to said members.

11. In apparatus of the class described, the combination of a frame having a relatively low load supporting section, supporting wheels for said frame, power means for driving certain of said wheels, a platform mounted on said low load supporting section, sets of co-acting devices carried by said low load supporting section and said platform, one set comprising a plurality of inclines and the other set comprising a plurality of rollers engaging said inclines, a motor mounted on said relatively low load supporting section below the upper surface thereof and underneath said platform, and an element operated by said motor in a direction parallel to the vertical planes in which said rollers move to engage said inclines and having operative connection with said platform to move it, whereby said sets of devices co-act to raise and lower said platform relative to said load supporting frame section.

12. In a truck construction, the combination of a frame having a relatively low section comprising a pair of longitudinally extending side members and a cross member connected to their free ends, traction and supporting wheels for said frame, a platform arranged to be supported by said side members when in its lowered position and bodily movable upwardly relatively thereto, a motor supported between said side members, a thrust member operatively connected to said platform, and screw and nut elements, one said element being operatively connected to said motor and the other said element being connected to said thrust member, for operating said thrust member.

13. In a truck construction, the combination of a frame having a relatively low section comprising a pair of longitudinally extending side members and a cross member connected to their free ends, traction and supporting wheels for said frame, a platform arranged to be supported by said side members when in its lowered position and bodily movable vertically relatively thereto, a thrust member disposed longitudinally of and between said side members and operatively connected with said platform to move it upwardly, a motor supported between said thrust member and one of said side members, and driving connections between said motor and said thrust member for operating the latter.

14. In apparatus of the class described, the combination of a frame having a pair of relatively low horizontal members, a pair of transverse members extending between said horizontal members, a longitudinal support connected to said transverse members and arranged between said horizontal members, pairs of wheels for supporting said frame, the wheels of one pair being connected to said support to move relative thereto for steering said frame, a platform movably mounted on said horizontal members to bodily move upwardly relative thereto, and an operating mechanism, including a motor for moving said platform, said operating mechanism including the motor being arranged beneath said platform and supported between said horizontal members.

15. In a truck construction, the combination of a frame having a relatively low section comprising a pair of longitudinally extending side members, traction and supporting wheels for said frame, a platform bodily movable upwardly and downwardly relative to said side members, a thrust member disposed longitudinally of said side members and operatively connected with said platform to move it, a motor supported between said side members and arranged between said thrust member and one of said side members, and driving connections between said motor and said thrust member for operating the latter.

16. In a trunk construction, the combination of a frame having a relatively low section comprising a pair of longitudinally extending side members, traction and supporting wheels for said frame, a platform supported on said side members to move upwardly and downwardly relative thereto, a thrust member disposed longitudinally of and between said side members and operatively connected with said platform to move it, a motor supported between said side members, and driving connections including a friction clutch between said motor and said thrust member for operating the latter.

17. In a truck construction, the combination of a frame having a pair of longitudinally extending, relatively low side members, traction and supporting wheels for said frame, a platform bodily movable upwardly and downwardly relative to said side members, a thrust member disposed longitudinally of and between said side members and operatively connected with said platform to move it, a motor supported between said side members, and driving connections including a reduction gearing between said motor and said thrust member for operating the latter.

18. In a truck construction, the combination of a frame having a pair of longitudinally extending, relatively low side members, traction and supporting wheels for said frame, a platform bodily movable upwardly and downwardly relatively to said side members, a thrust member disposed longitudinally of and between said side members and operatively connected with said platform to move it, a motor supported between said side members and arranged between said thrust member and one of said side members with its shaft extending parallel to said thrust member, and driving connections between said motor and said thrust member for operating the latter.

19. In a truck construction, the combination of a frame having a pair of relatively low, longitudinally extending side members, traction and supporting wheels for said frame, a platform supported on said side members to move upwardly and downwardly relatively thereto, a motor supported between said side members, and mechanism, including a screw and a nut, disposed between said motor and said platform for operating the latter.

20. In a truck construction, the combination of a frame having a relatively low section comprising a pair of horizontal side members, traction and supporting wheels for said frame, a platform mounted on said side members to move upwardly and downwardly relative thereto, and mechanism including a motor arranged below said platform and pivotally connected thereto and to said relatively low section for operating said platform, said mechanism including a thrust member disposed in a plane intermediate the pivotal connections between said mechanism and said relatively low section.

21. In a truck construction, the combination of a frame, traction and supporting wheels for said frame, a platform supported on said frame to move upwardly and downwardly relative thereto, and mechanism including a motor, arranged below said platform and pivotally connected thereto and to said frame for operating said platform, said mechanism including a screw and a nut.

22. In a truck construction, the combination of a frame having a pair of longitudinally extending, relatively low side members, traction and supporting wheels for said frame, a platform supported on said side members to move upwardly and downwardly relative thereto, a thrust member disposed longitudinally of and between said side members and operatively connected with said platform to move it, a motor supported between said side members, and driving connections between said motor and said thrust member for operating the latter, said driving connections including a clutch having means to control one element to render the clutch inoperable above any predetermined load.

In testimony whereof I affix my signature.

JOHN H. HERTNER.

Witnesses:—
B. F. STONER,
MILDRED STEIN.